United States Patent [19]
Zenz

[11] 3,800,508
[45] Apr. 2, 1974

[54] RESTRAINED BED FILTER-REACTOR

[76] Inventor: Frederick A. Zenz, P.O. Box 205, Route 9D, Garrison, N.Y. 10524

[22] Filed: Oct. 26, 1970

[21] Appl. No.: 83,689

[52] U.S. Cl............................ 55/96, 23/284, 34/168, 55/98, 55/288, 55/432, 55/474, 55/479
[51] Int. Cl.............................................. B01d 29/08
[58] Field of Search........................ 55/97–99, 479, 55/288, 73, 474, 302, 96, 432; 210/264, 269; 23/288 G, 288 S, 284; 34/168–174, 178, 64, 65

[56] References Cited
UNITED STATES PATENTS

| 3,296,775 | 1/1967 | Squires | 55/474 |
| 3,410,055 | 11/1968 | Zenz | 55/98 |
| 1,570,869 | 1/1926 | Thompson | 55/99 |

FOREIGN PATENTS OR APPLICATIONS

| 381,500 | 5/1924 | Germany | 55/474 |
| 522,573 | 4/1931 | Germany | 55/474 |
| 243,117 | 11/1925 | Great Britain | 55/474 |
| 450,048 | 7/1936 | Great Britain | 55/474 |

Primary Examiner—Bernard Nozick
Attorney, Agent, or Firm—William P. Keegan

[57] ABSTRACT

There is disclosed a granular bed filter in which the granular material is retained in the bed by the pressure of the fluid stream entering the filter. When it is desired to clean the filter of accumulated filter cake, the pressure, i.e., the velocity of the fluid stream is reduced so that bed material flows from the filter. It is also disclosed that the filter can be used in chemical processes in which the granular bed material is the feed material for the process.

13 Claims, 8 Drawing Figures

PATENTED APR 2 1974　　3,800,508

INVENTOR.
FREDERICK A. ZENZ
BY William L. Keegan
ATTORNEY

RESTRAINED BED FILTER-REACTOR

This invention relates to granular bed filters, and especially to such filters in which the accumulated filter cake is periodically removed, or the filter material is periodically replenished.

In removing particles and other pollutants from a fluid stream, there is often provided a filter comprising a granular bed through which the fluid stream passes. In some cases the fluid stream contains particulate matter that is removed by the filtering action of the bed, while in other cases the pollutants are removed from the fluid stream by reacting with the bed material.

Granular bed filters are often cleared of filter cake by a reverse blast of backwashing fluid which removes the filter cake and if the bed is not contained, some of the bed material, from the filter element. The collected particles are then separated from the bed material and the latter is recirculated to a supply hopper for reintroduction to the filter element. My earlier patent, U.S. Pat. No. 3,410,055, disclosed a granular bed filter in which the bed material was fluidized by the backwash fluid and the particles of the filter cake removed through an inlet screen which kept the bed material in the filter element. In this way, the need to recirculate bed material was obviated.

In those filters in which the pollutants reacted with the bed material so that the bed material had to be replenished, it is not uncommon to have the bed material flow continually through the filter element so that it is in constant process of replenishment. It can well be imagined that the material circulation problem is enormous, and, undoubtedly inefficient, since all of the flowing bed material, by the time it leaves the filter element, will not have reacted with the pollutants.

The object of the present invention is to provide a granular bed filter which can be cleaned of accumulated filter cake without mechanical means and without backwashing the filter bed with a fluid.

In carrying out the invention there is provided a filter element in which the inlet side comprises a series of generally horizontal slats or louvres arranged one above another in spaced apart relationship. The arrangement is such, i.e., the width of each slat, its angular position, and the spacing between slats, that the angle a line drawn between the leading edge of one slat and the trailing edge of the slat next above makes with the horizontal is slightly greater than the angle of repose of the granular material in the filter element. The granular material is held or maintained in the filter element by the pressure exerted on the material by the fluid stream being filtered by the filter element. By momentarily reducing the pressure of the fluid stream, the filter material will begin to rain over the leading edge of the slats to carry the accumulated filter cake and a small portion of the filter material to a collection hopper. The material collected in the collection hopper is then separated with the bed material being recirculated to the granular filter bed.

Features and advantages of the invention may be gained from the foregoing and from the discription of a preferred embodiment thereof which follows.

Figures 5, 6:
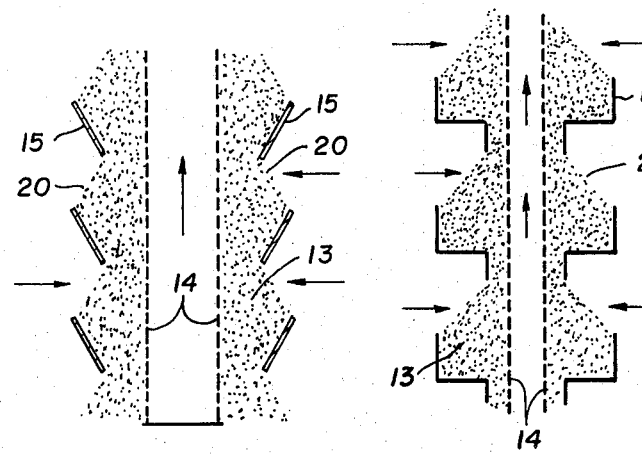
Figure 7:
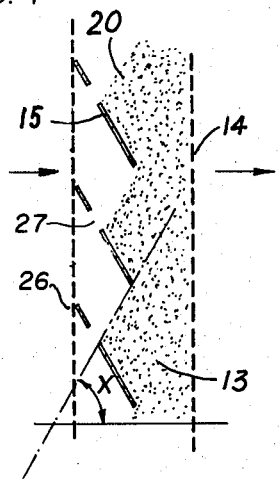
Figure 8:
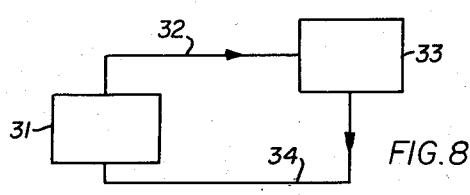

FIGS. 5, 6, and 7 schematically show alternate arrangements of the filter element of the system; and FIG. 8 is a schematic illustration of a processing system embodying the filter of the present invention.

Figure 1:
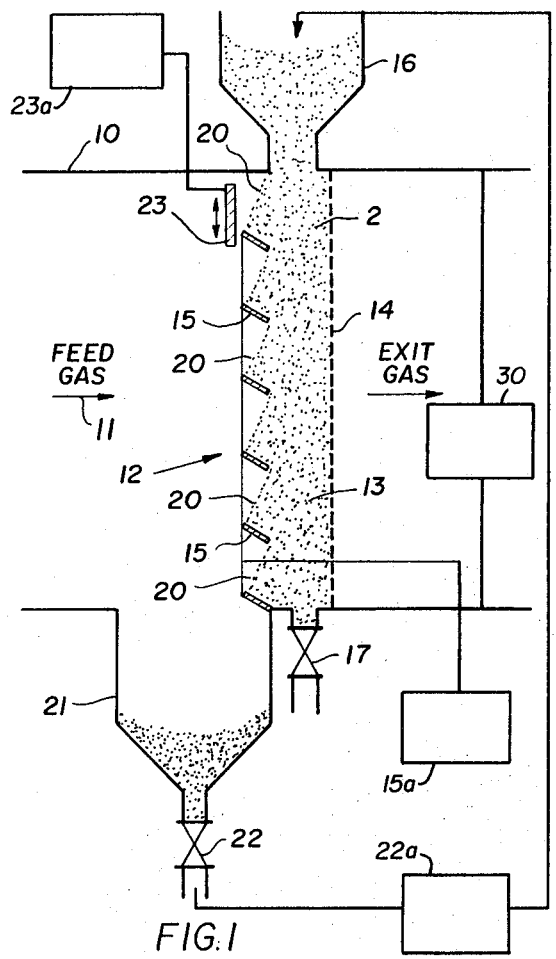
FIG. 1 is a schematic representation of a granular bed filter system embodying the invention.

The basic principal of the invention will best be gained from a description of FIG. 1 which schematically represents one embodiment of the invention as it pertains to the filtration of particulate dust from a feed gas stream. This will illustrate the operative principle so that its application to other processes will readily be suggested and apparent.

A dusty feed gas is fed through a duct 10 in the direction of the arrow 11. The gas passes through filter element 12 which comprises a thin bed of granular solids 13 maintained in place by a porous membrane 14, such as a wire mesh screen, on the downstream side of the element 12 and by a series of angularly disposed horizontal slats or louvres 15 on the inlet side of element 12. The granular solids may be sand or other inert material if particulate matter is to be filtered, but it could also be an active agent if a reactive operation is to be performed.

The filter element bed 13 is fed by gravity from an overhead hopper 16 so that the bed may be replenished when desired. This may be done when the bed is intentionally drained through valve 17 or when bed material is lost through a bed cleaning operation hereinafter described.

When operating as a filter, a cake of separated particulate matter will form on the exposed surfaces 20 of bed 13. This collected filter cake will clog the interstices between the granular material of bed 13 and will eventually lead to an excessive pressure drop in element 12 thus requiring cleaning of the bed.

Figures 2, 3:
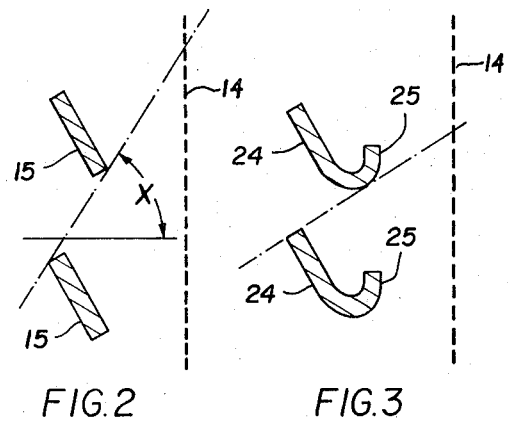
FIG. 2 is a fragmentary view of the filter element of the filter system.
FIG. 3 is a fragmentary view of an alternate design for the louvres of the filter element of the system.

It is the object of this invention to provide for this removal of filter cake by orienting the slats 15 in such a manner than the angle X, see FIG. 2, formed between a horizontal line and a line drawn between leading edge of one slat and the trailing edge of the slat next above exceeds the angle of repose of the granular material making up bed 13. The angle of repose is measured in a static, motionless medium and is the maximum angle with the horizontal at which loose granular material will retain its position without tending to slide.

The invention is thus founded in the observation that the granular material in bed 13 can be retained in the filter element 12 even if the angle X exceeds the normal angle of repose for the material of bed 13 provided the inflowing velocity of the feed gas is high enough. The more angle X exceeds the angle of repose, the higher the velocity of the feed gas must be. With slats oriented so that angle exceeds the bed material's angle of repose, it is possible to remove accumulated filter cake by momentarily discontinuing or lowering the inflowing feed gas velocity whereupon bed material with filter cake on its surface will slide over the leading edges of slats 15 and fall as a curtain into collecting hopper 21. This hopper can occasionally be drained through valve 22, and, after separation of the filter cake particles from the granular bed material, the latter material can be recirculated to hopper 16 by recirculation means 22a.

The angle X to which exposed bed material may be restrained without falling from the slats 15 is a function of the feed gas velocity, the free fall velocity of the bed material in the fluid medium, i.e., the feed gas, and the normal angle of repose of the bed material in motionless fluid medium. As an example, the angle of repose of 20 to 30 mesh sand increases nearly 20° with an inflowing air velocity of 1.6 feet per second.

It is to be considered within the intent of this invention to provide where practical any number of mechanical aids to supplement the control of bed spillover. For example, it has been found that spillover can be zoned by simply locally blocking the inflow of dirty feed gas as with, for example, a strip of metal 23 or other blanking means which could be positioned adjacent the leading or inlet edges of the slats and drawn back and forth or up and down across the face of the filter panel by means 23a. This would cause local sliding off of bed solids in the regions shaded by the blanking strip, from the inlet or feed gas.

To increase versatility of a given arrangement it is also advisable where practical to provide mechanical means for adjusting the angle by constructing the slats so that they may either be pivoted by means 15a or altered in vertical spacing. It has also been found in practice that with certain bed solids, due to intergranular friction in gravity flow, it is necessary to provide slightly increasing design values of X between the slats from the uppermost surface 20 nearest the feed hopper 16, to the lowermost surface 20 just above the spillover 21. In addition to or as an alternative to providing increasing design angles X from uppermost to lowermost slat orientations, it has also been found advantageous to bend the lower edges of the slats upward as shown in FIG. 3. Slats 24 in FIG. 3 are bent so that their lower edges 25 are vertical or at 90° to the horizontal.

Figure 4:
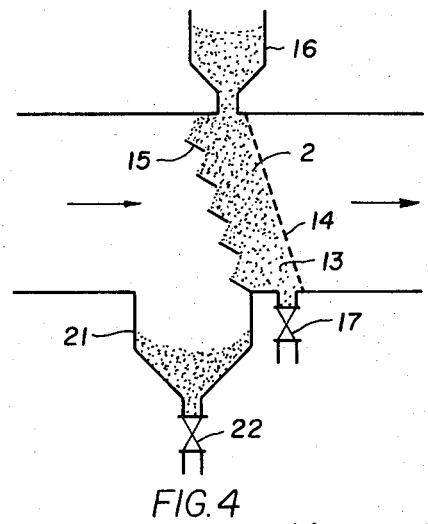
FIG. 4 is schematic representation of a filter system similar to that shown in FIG. 1.

It is also within the intent of this invention that the angle X may be adjusted to its desirable value by inclining the entire filter panel to the vertical as depicted in FIG. 4. Whatever the orientation, it is understood that without a feed gas flow through the exposed surfaces 20, bed solids would continuously spill over the slat edges. FIGS. 1 through 4 indicate schematically vertical cross sections of a panel type arrangement with straights slats but it is to be understood that the same flow may be accomplished from a cylindrical form of apparatus in which the slats constitute truncated cones or short cylinders as in FIGS. 5 and 6. In order to further restrict bed spillover to a limited maximum rate at zero feed gas velocity the slats may be bounded by a screen 26 as in FIG. 7 on the inlet or feed gas side as well as screen 3 on the discharge side and bed spillover limited by providing holes or slots 27 in each slat such that the angle X between the horizontal and a line drawn from the lower edge of the hole or slot in a given slat to the lower edge of the next adjacent slat above as shown in FIG. 7 exceeds the normal angle of repose of the bed solids.

Fluid restrained beds of the type herein desclosed are advantageously used in processes in which, (1) the bed solids can be used in a subsequent reaction and hence must be removed from the filter vessel or themselves must react with the inflowing fluid and must therefore be replenished; (2) the bed solids serve an additional purpose, beyond particle filtration, such as gas adsorption or catalysis and hence require regeneration; and (3) the bed solids accumulate a product and must again be removed.

The restraining technique which permits a higher bed angle of repose shows more bed face surface per unit equipment size and allows simple cleaning, without necessitating backwash mechanisms, by momentarily reducing the inflowing fluid velocity to one module of a bank of parallel filter panels or even to a specific area of any one module. Simply sweeping a blanking sheet across the face of the unit, thus reducing the gas flow into the blanked area, causes solids to locally cascade over the slat edges carrying along accumulated filter cake when used for this purpose. By proper choice of bed solids, slat geometry and face velocity it is possible to design for minimal cascading upon relaxing or reducing the restraining fluid velocity by means 30. Thus one could expose solids first to adsorption or other reaction and then to filtration; the former exposure being perhaps longer so that filtration would be carried out with saturated solids.

There are numerous examples of situations in which the restrained bed technique would be highly advantageous, in particular in situations in which the bed solids consist of feed materials to a subsequent process. In the drying of granulated coal in fluidized beds 31 (FIG. 8) there is a considerable carryover of coal dust in the gases 32 leaving the fluid bed which must be recovered by means of cyclones or wet type scrubbers. A restrained bed filter 33 of the type herein disclosed placed in the dusty effluent gas stream 32 from such a drying operation using fresh wet feed coal 34 as the restrained bed material cascading intermittently over the slats into the dryer would serve to filter the dusty effluent, preheat the wet coal feed, cool the effluent gas, meter coal feed to the dryer bed, and recover all the coal fed to the dryer, including the fines, in the dryer product drawoff.

Another similar example using process feed as the effluent filter occurs in electro-reduction processes such as the recovery of aluminum from bauxite. In such process, the bauxite is fed to the reduction cells in granular or powder form. If the effluent gases from the cell were fed through a restrained bed of feed bauxite there would simultaneously occur cleanup of the effluent gases and recovery of all usable gaseous as well as solid constituents in the effluent by adsorption, filtration and return to the cells along with fresh feed bauxite. Also a significant heat recovery would be effected by cooling of the effluent gases in exchange with cold bauxite feed.

In the granulation, for example, of urea and ammonium nitrate fertilizers it is common practice to prill these products by spraying the molten material through nozzles atop a tall so-called prilling tower allowing the droplets to solidify as they free fall to the bottom or in some instances to spray the melt onto a bed of fines passing through a rotary kiln to which fresh fines are added by recycling the product which comes out too fine and also grinding and recycling the product which comes out too large. The restrained bed technique would permit prilling or granulation of such materials by a fluidized bed technique in which melt would be sprayed onto cascading recycled fines while these fines held in the restrained bed acted as a filtration device reducing pollution and product loss from the fluidizing gases. Such an arrangement would eliminate the more costly rotating kiln and permit better control of the desired product size by the rate of recirculation. In addition the melt could be fed at lower concentration because of the enhanced heat transfer afforded by direct gas to particle contact.

For the filtration of particulate effluents such as fly ash and the simultaneous recovery of gaseous sulfur dioxide it is obvious that a restrained bed filter-adsorber charged with magnesium oxide or other adsorbent could accomplish simultaneous removal of both pollutants. The adsorbent magnesium oxide would be converted to magnesium sulfite and could be used as feed to a sulfuric acid plant in which its sulfur content would be removed and the regenerated magnesium oxide recycled to the restrained bed.

An additional advantage of the restrained bed technique lies in the ability to wet the cascading solids when the restraining fluid velocity is reduced. The addition of a wet spray to the cascading solids further enhances their ability to filter particulate fines and carryout more efficient wet scrubbing of effluent gases.

Having thus described the invention, it is clear that many apparently different embodiments and applications thereof will suggest themselves to those skilled in the art. Therefore, it is intended that the foregoing description and the drawing be interpreted in an illustrative rather than a limiting sense.

I claim:

1. The method of treating at least one of a granular material and a fluid by contact with one another, said method comprising, arranging the granular material in a vertical bed having a plurality of transversely disposed, upwardly spaced, fluid entry portions separated and supported by interposed elements having leading and trailing edges with respect to said bed, the arrangement being such that the angle formed by the horizontal and a line drawn between the leading edge of one element and the trailing edge of the element next above exceeds the angle of repose for the granular material in the bed, and a porous exit member spaced from the trailing edges of the elements, passing fluid through said bed at a velocity that will keep the granular material from flowing out of the fluid entry portions of said bed over the leading edges of the elements, and thereafter reducing the velocity of the fluid flowing through said bed to allow some of the granular material to flow from the entry portions over the leading edges of the elements.

2. The method of treating the effluent fluid from a process apparatus requiring feed material which comprises the steps of providing a granular media filter through which the effluent fluid passes, said filter comprising a series of media retaining elements on its input side which are disposed such that the angle formed by the horizontal and a line drawn between the leading edge of one element and the trailing edge of the element next above is greater than the angle of repose of the granular media provided for said filter, filling said filter with granular media consisting of feed material for said process apparatus, passing effluent fluid from the process apparatus through said filter at a velocity that will keep the granular media from flowing out of said filter over the leading edges of the media retaining elements, periodically reducing the velocity of the effluent fluid flowing through said filter to allow granular media and filtered material to flow from said filter over the leading edges of the media retaining elements, and feeding granular media and filtered material flowing over the leading edges of the media retaining elements of said filter to said process apparatus.

3. Apparatus for treating at least one of a granular material and a fluid by contact with one another, said apparatus comprising a plurality of elements spaced apart in a generally vertical arrangement and a porous member spaced from said elements to provide support for granular material supplied to the space between said plurality of elements and said porous member, the arrangement being such that the angle formed by the horizontal and a line drawn between the leading edge of one element and the trailing edge of the element next above is greater than the angle of repose for the granular material supplied between said elements and said porous member.

4. Apparatus according to claim 3 including mechanical means arranged adjacent to a portion of said plurality of elements for blocking the flow of a fluid to said plurality of elements, and means for moving said mechanical means across other portions of said plurality of elements.

5. Apparatus accoding to claim 3 in which the angle formed by the horizontal and a line drawn between the leading edge of one element and the trailing edge of the element next above increases from the topmost pair of elements to the lowest pair of elements.

6. Apparatus according to claim 3 in which the trailing edge of an element is bent to a generally vertical orientation.

7. Apparatus according to claim 3 including means for altering the angle the elements make with the horizontal.

8. Apparatus according to claim 3 in which the vertically arranged elements are generally truncated cylinders or cones.

9. Apparatus according to claim 3 including granular material, and a feed hopper for feeding said granular material to the space between said plurality of elements and said porous member.

10. Apparatus according to claim 9 including chemical processing apparatus requiring feed material, and wherein said granular material is the feed material for said chemical processing apparatus.

11. Apparatus according to claim 3 including a bed of granular material in the space provided between said plurality of elements and said porous member, means for feeding a fluid stream through said bed of granular material, said stream entering through the spaces between the leading edges of said plurality of elements, and means for reducing the velocity of the fluid stream entering said bed whereby granular material will flow out of said bed over the leading edges of said plurality of elements.

12. Apparatus according to claim 11 including a feed hopper for feeding granular material to said bed, overflow means for collecting the material flowing out of the bed when the velocity of the fluid stream is reduced, separation means for separating granular bed material from particulate matter removed from the fluid stream, and means for recirculating said granular bed material to said feed hopper.

13. Apparatus according to claim 11 including overflow means for collecting the material flowing out of the bed when the velocity of the fluid stream is reduced, processing apparatus for generating the fluid stream passing through said bed of granular material, and means for feeding material collected in said overflow means to said processing apparatus.

* * * * *